(12) United States Patent
Narayanan Nampy et al.

(10) Patent No.: US 9,909,624 B2
(45) Date of Patent: Mar. 6, 2018

(54) COMPOSITE DRIVESHAFT FOR A ROTARY SYSTEM

(71) Applicant: ROHR, INC., Chula Vista, CA (US)

(72) Inventors: Sreenivas Narayanan Nampy, San Diego, CA (US); Matthew J. Smelcer, Middleburg, FL (US)

(73) Assignee: ROHR, INC., Chula Vista, CA (US)

(*) Notice: Subject to any disclaimer, the term of this patent is extended or adjusted under 35 U.S.C. 154(b) by 0 days.

(21) Appl. No.: 15/273,277

(22) Filed: Sep. 22, 2016

(65) Prior Publication Data

US 2017/0082149 A1    Mar. 23, 2017

Related U.S. Application Data

(60) Provisional application No. 62/222,052, filed on Sep. 22, 2015.

(51) Int. Cl.
| | |
|---|---|
| *B64C 27/14* | (2006.01) |
| *F16C 1/08* | (2006.01) |
| *F16C 3/02* | (2006.01) |
| *F16D 3/06* | (2006.01) |
| *F16D 3/00* | (2006.01) |
| *F16D 1/027* | (2006.01) |

(52) U.S. Cl.
CPC .............. *F16D 3/005* (2013.01); *B64C 27/14* (2013.01); *F16C 1/08* (2013.01); *F16C 3/026* (2013.01); *F16D 1/027* (2013.01); *F16D 3/06* (2013.01); *F16D 2200/006* (2013.01); *F16D 2200/0078* (2013.01); *F16D 2250/0069* (2013.01)

(58) Field of Classification Search
CPC .. B64C 27/14; F16C 1/08; F16C 3/023; F16C 3/026; F16D 1/06; F16D 3/005; F16D 3/06
USPC ........................... 464/88, 155, 162, 181–183
See application file for complete search history.

(56) References Cited

U.S. PATENT DOCUMENTS

| | | | |
|---|---|---|---|
| 4,173,128 A | 11/1979 | Corvelli | |
| 4,722,717 A | 2/1988 | Salzman et al. | |
| 5,725,434 A * | 3/1998 | Haben | F16C 3/026 464/181 |
| 6,077,165 A * | 6/2000 | Jewell | F16D 3/52 464/88 |
| 7,335,108 B2 | 2/2008 | Lin et al. | |
| 8,664,792 B2 | 3/2014 | Rebsdorf | |
| 8,876,614 B2 | 11/2014 | Nakamura et al. | |
| 2004/0077413 A1* | 4/2004 | Bradley | F16C 3/026 464/181 |
| 2012/0283029 A1 | 11/2012 | Lawrie | |

* cited by examiner

*Primary Examiner* — Josh Skroupa
(74) *Attorney, Agent, or Firm* — Cantor Colburn LLP

(57) ABSTRACT

A composite driveshaft includes a body having a first end, a second end, and an intermediate portion defining a driveshaft axis (DSA). The first end defines a first coupling region and the second end defines a second coupling region. At least one of the first and second coupling regions defines a virtual hinge configured to accommodate both bending moments and axial changes of the body.

4 Claims, 5 Drawing Sheets

COMPOSITE DRIVESHAFT FOR A ROTARY SYSTEM

BACKGROUND

Exemplary embodiments pertain to the art of rotary wing aircraft and, more particularly, to a composite driveshaft for a rotary wing aircraft.

In a rotary drive system, a driveshaft may be used to transfer torque from a rotating driving component to a rotating driven component. When the system performs at high speeds and/or high torque, it is common to use U-joints or other axial misalignment compensating devices. A U-joint, for example, might be placed at each end of the driveshaft, forming part of the connection between the driveshaft and the driving component and between the driveshaft and the driven component. Many types of misalignment compensating devices are known. Basically, they function to ensure the driveshaft is loaded only with torque, and they minimize any bending forces and compressive or tensile forces. One advantage is that by limiting bending forces, fatigue life of the driveshaft is especially increased.

The present invention is relevant to lightweight rotary drive systems for high speed and/or high torque applications, which may be especially advantageous in the aerospace industry. For example, a helicopter has a driveshaft that drives a tail rotor. There are numerous other examples of rotary drive systems in rotary wing and fixed wing aircraft. In aerospace applications, weight is a disadvantage. A driveshaft with traditional U-joints or other traditional misalignment compensating devices may be heavier than desired for the rotary drive system. This invention provides a lightweight driveshaft with an integrated axial misalignment compensating feature, which may be made from lightweight composite materials to further minimize weight.

BRIEF DESCRIPTION

Disclosed is a composite driveshaft including a body having a first end, a second end, and an intermediate portion defining a driveshaft axis (DSA). The first end defines a first coupling region and the second end defines a second coupling region. At least one of the first and second coupling regions defines a virtual hinge configured to accommodate axial changes of the body without experiencing material failure.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
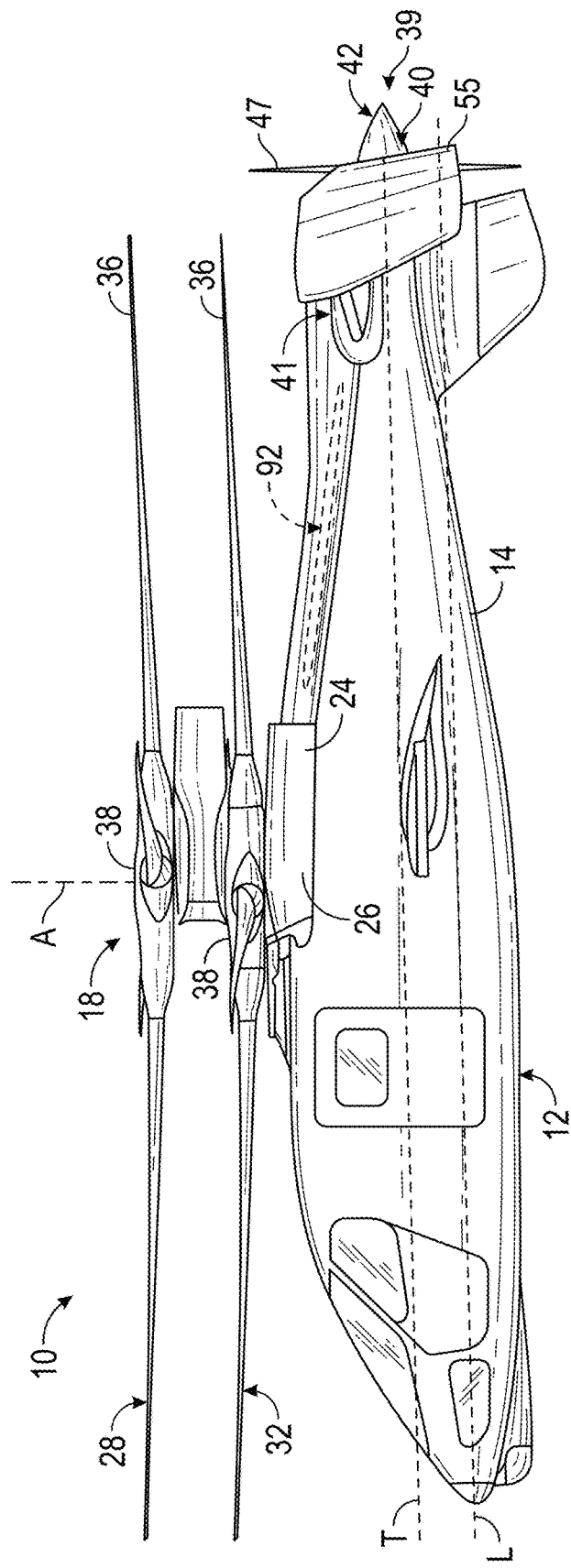
FIG. 1 depicts a side view of a rotary wing aircraft having a composite driveshaft, in accordance with an exemplary embodiment.

FIG. 1 depicts an exemplary embodiment of a rotary wing, vertical take-off and land (VTOL) aircraft 10. The aircraft 10 includes an airframe 12 with an extending tail 14. A dual, counter rotating, coaxial main rotor assembly 18 is located at the airframe 12 and rotates about a main rotor axis, A. The main rotor assembly 18 is driven by a power plant system, for example, one or more engines 24 via a gearbox 26. The main rotor assembly 18 includes an upper rotor assembly 28 driven in a first direction (e.g., counter-clockwise) about the main rotor axis, A, and a lower rotor assembly 32 driven in a second direction (e.g., clockwise) about the main rotor axis, A, opposite to the first direction (i.e., counter rotating rotors). Each of the upper rotor assembly 28 and the lower rotor assembly 32 includes a plurality of rotor blades 36 secured to a rotor hub 38. Of course, it should be understood that the above description is provide one example of a rotary wing aircraft platform, exemplary embodiments described herein are not limited to multi-rotor systems.

Figure 2:
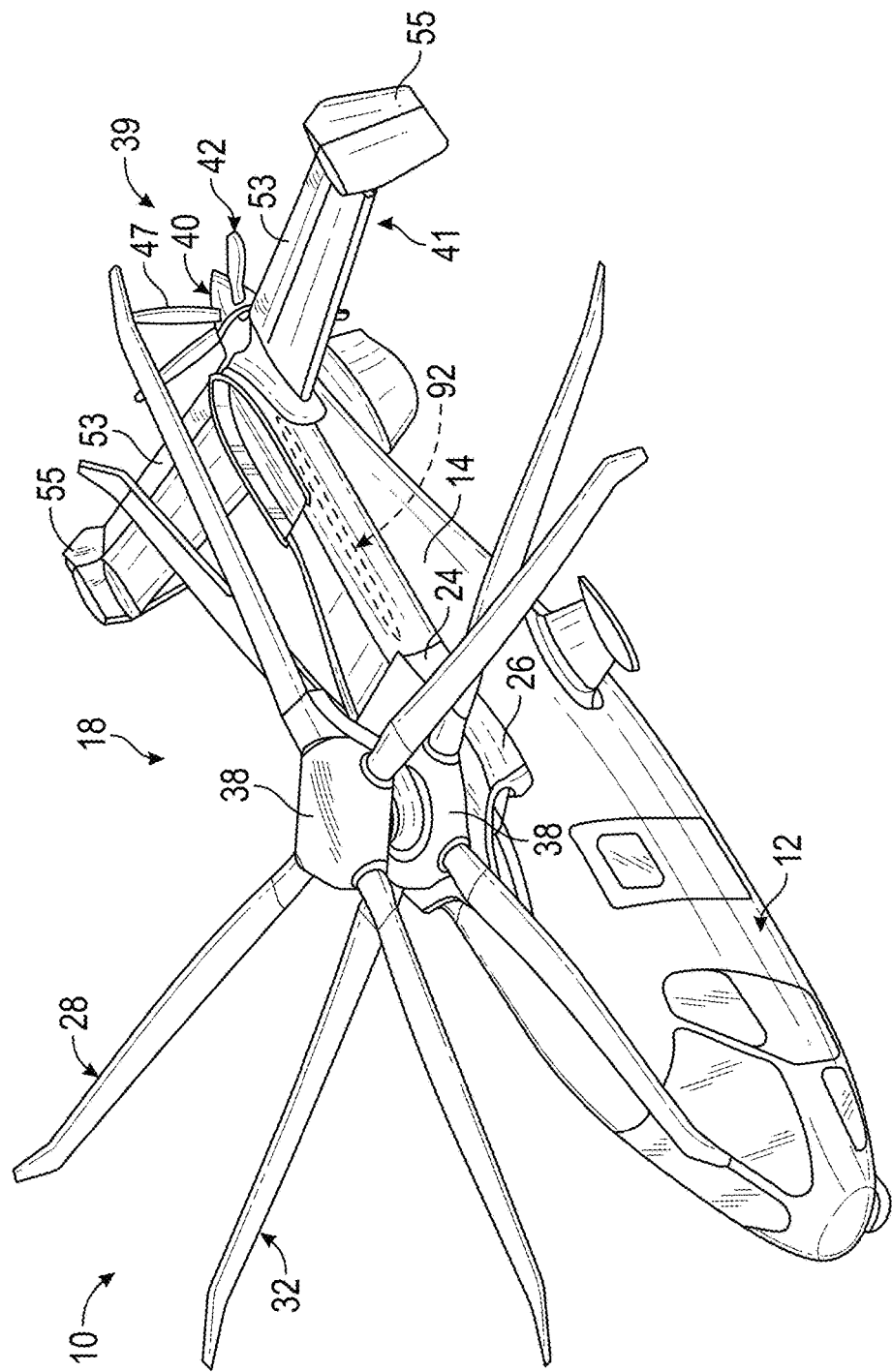
FIG. 2 is an upper perspective view of the rotary wing aircraft of FIG. 1.

In some embodiments, the aircraft 10 further includes a tail rotor system 39, shown in the form of a translational thrust system 40, located at the extending tail 14. Translational thrust system 40 may provide translational thrust (forward or rearward) for aircraft 10. Referring to FIG. 2, translational thrust system 40 includes a propeller 42 and is positioned at a tail section 41 of the aircraft 10. Propeller 42 includes a plurality of propeller blades 47. In exemplary embodiments, the pitch of propeller blades 47 may be altered to change the direction of thrust (e.g., forward or rearward). The tail section 41 includes active elevators 53 and active rudders 55 as controllable surfaces. Of course, it should be understood that tail rotor system 39 may also represent a conventional system configured to counter a torque effect generated by main rotor assembly 18.

Figure 3:
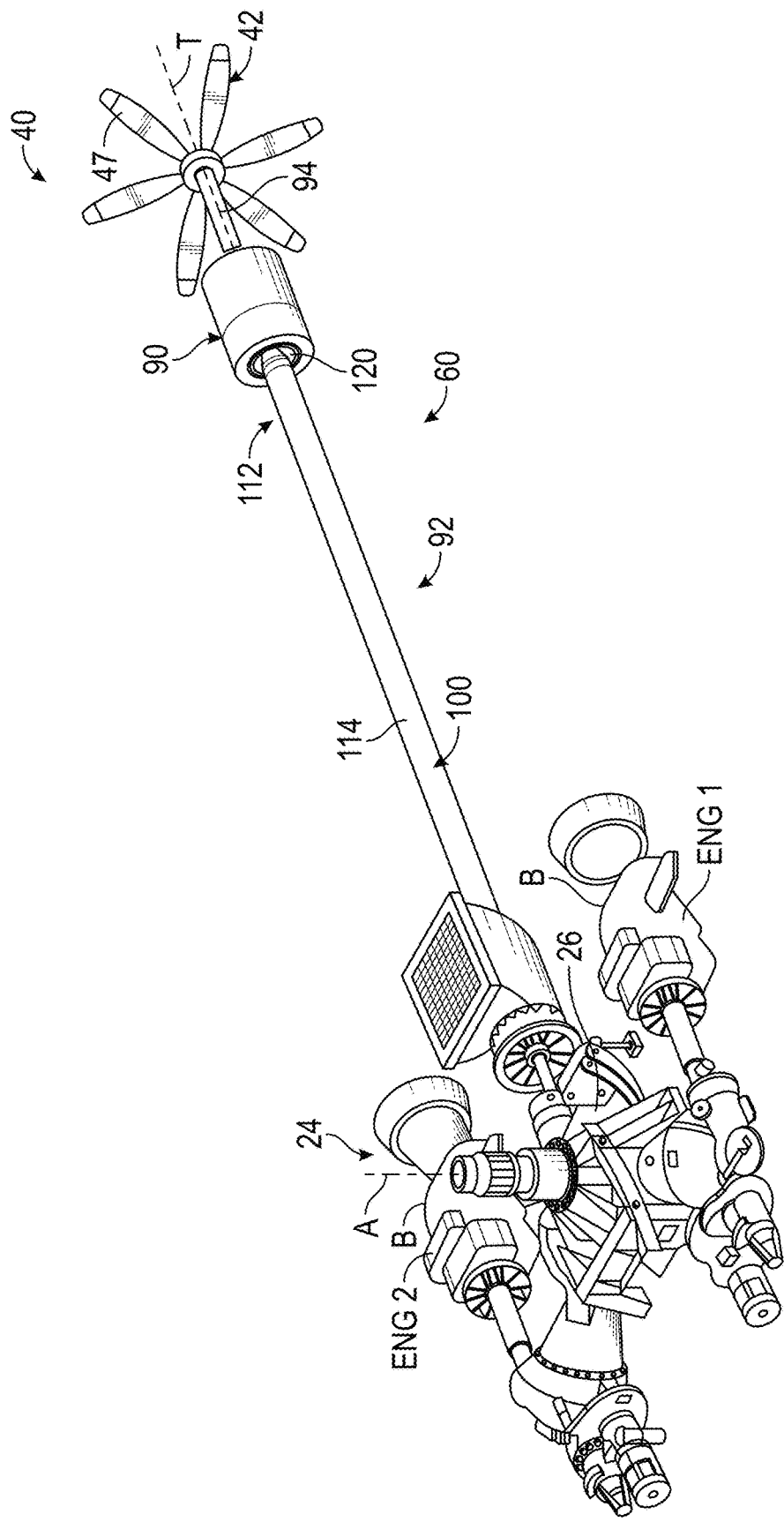
FIG. 3 depicts a drive system of the rotary wing aircraft of FIG. 1 including a composite driveshaft, in accordance with an exemplary embodiment.

Referring to FIG. 3, aircraft 10 includes a drive system 60 that drives main rotor assembly 18 about the axis of rotation, A, through gearbox 26 by engines 24. Although FIG. 3 depicts two engines 24 (ENG 1 and ENG 2), it is understood that aircraft 10 may use a single engine 24. Engines 24 generate power available for flight operations and couples such power to the main rotor assembly 18 and the translational thrust system 40 through the gearbox 26. Gearbox 26 may be interposed between engines 24, main rotor assembly 18 and translational thrust system 40. A portion of drive system 60 downstream of gearbox 26 includes a combined gearbox 90 (also referred to as a clutch). Combined gearbox 90 selectively operates as a clutch and a brake for operation of the translational thrust system 40 with gearbox 26. Combined gearbox 90 also operates to provide a rotor brake function for the main rotor assembly 18.

Combined gearbox 90 generally includes an input 92 and an output 94 generally defined along an axis parallel to rotational axis, T. Input 92 is generally upstream of combined gearbox 90 relative to gearbox 26 and output 94 is downstream of the combined gearbox 90 and upstream of translational thrust system 40. It should be understood that various combined gearbox 90 systems may be utilized to include, but not to be limited to, mechanical, electrical, hydraulic and various combinations thereof.

Figure 4:
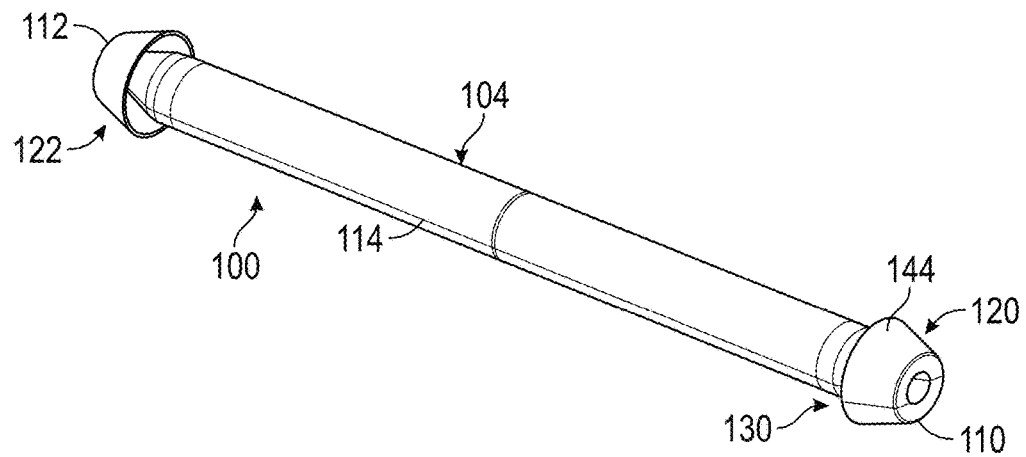
FIG. 4 depicts a perspective view of the composite driveshaft of FIG. 3.
Figure 5:
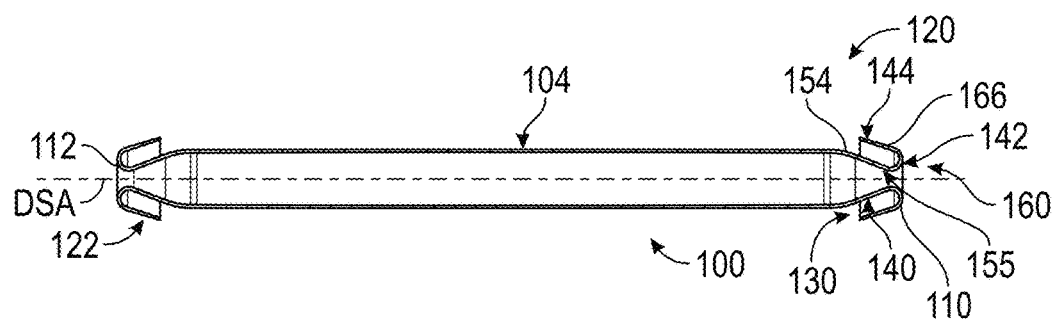
FIG. 5 depicts a cross-sectional view of the composite driveshaft of FIG. 4.
Figure 6:
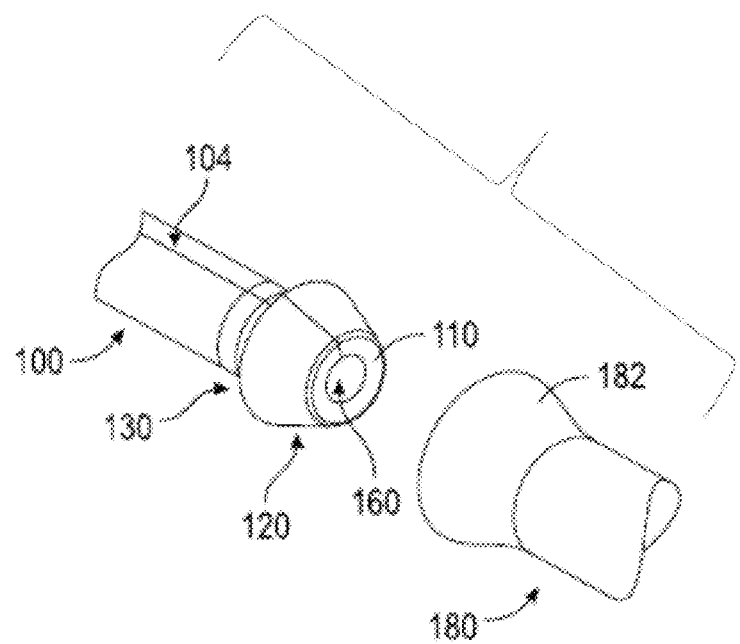
FIG. 6 depicts a partial perspective view of a end of the composite driveshaft of FIG. 4.
Figure 7:
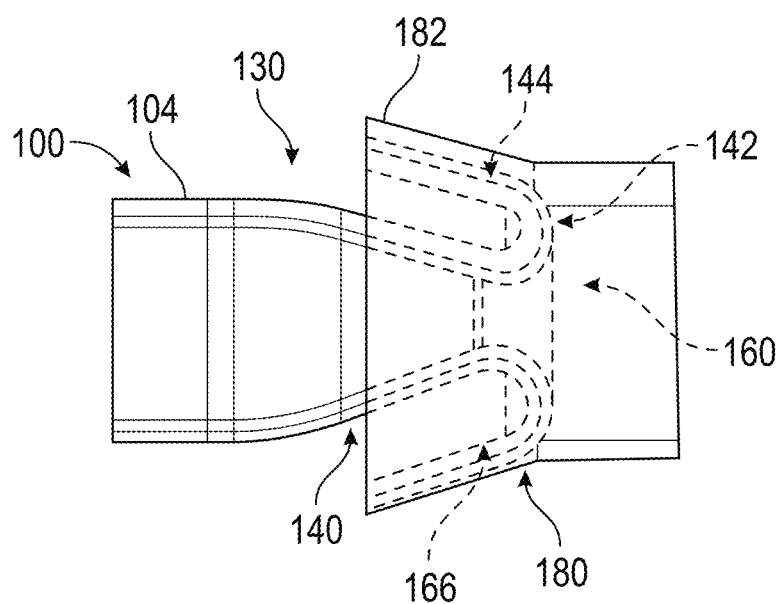
FIG. 7 depicts a partial cross-sectional view of the end of FIG. 6 connected with an end fixture.

In accordance with an aspect of an exemplary embodiment, input 92 takes the form of a composite driveshaft 100 shown in FIG. 4. Composite driveshaft 100 includes a body 104 having a first end 110, a second end 112, and an intermediate portion 114 extending therebetween. First end 110 defines a first coupling region 120 that provides an interface with gearbox 26 and second end 112 defines a second coupling region 122 that provides an interface with combined gearbox 90. Reference will now follow to FIGS. 5-7 describing first end 110 with an understanding that second end 112 may include similar structure. In one embodiment, the drive shaft includes a single cone without the need for diaphragm at each end.

In accordance with an aspect of an exemplary embodiment, first coupling region 120 includes a virtual hinge 130. At this point, it should be understood that the term "virtual hinge" describes a portion of composite driveshaft 100 that may bend, compress and/or extend in response to bending, axial, and tensile forces on composite driveshaft 100. Further, the term "virtual hinge" should be understood to accommodate such forces without mechanical linkages commonly associated with mechanical hinges; instead, the "virtual hinge" relies on material properties and geometry of one or more portions of body 104. More specifically, a virtual hinge (or an elastic hinge) and a mechanical hinge differ in that the mechanical hinge provides rigid body rotation whereas a virtual hinge (or elastic hinge) utilizes elastic deformation of a component.

In accordance with an aspect of an exemplary embodiment, virtual hinge 130 includes a first surface portion 140, a second surface portion 142 and a third, cantilevered surface portion 144. First surface portion 140 includes a first end section 154 that extends from intermediate portion 114, and a second end section 155 that leads to second surface portion 142. Second end section 155 defines a neck region 160 which, as will be discussed more fully below, establishes a pivot zone for composite driveshaft 100. Second surface portion 142 includes a bend region 166 that leads to third surface portion 144. In this manner, third surface portion 144 extends back over, at least in part, first surface portion 140. Bend region 166 may be established by neck region 160 and forms, at least in part, the pivot zone for virtual hinge 130. Motion in this region may be distinguished from a diaphragm approach in that the "sliding" in the neck region 160.

First coupling region 120 may connect to gearbox 26 through an end fixture 180. End fixture 180 may include a frustoconical receiver 182 receptive of third, cantilevered surface portion 144. A similar attachment (not shown) may provide an interface to combined gearbox 90. First coupling region 120 may be joined to end fixture 180 through a variety of known methods. For example, end fixture 180 may be bonded to first coupling region 120 after forming, or, could be formed and cured together in a single cure cycle (concurring). Further, end fixture 180 and first coupling region 120 may each have a region including an annular layer of material (not separately labeled). End fixture 180 and first coupling region 120 may be joined at a position when the annular layers of material are parallel to and overlap one another.

In further accordance with an aspect of an exemplary embodiment, each of first, second and third surface portions, 140, 142 and 144 may be formed from one or more plys or sheets of material (not separately labeled). Each of the sheets of material may be formed from one or more fibers (also not separately labeled). The sheets of material may be formed from a variety of materials including flexible matrix composite (FMC) materials, rigid matrix composite (RMC) materials, metals and/or hybrids including one or more of FMC, RMC, and metals. In accordance with an aspect of an exemplary embodiment, the sheets of material may be formed into plys in which the fibers may extend at a non-zero angle relative to bend region 166 to provide enhanced flexibility and desired strength properties. Other plies may include fibers that are oriented parallel to the DSA. Further, desired flexibility may be achieved through material choice, laminate design, e.g., staking sequence, fiber orientation and the like.

At this point, it should be understood that composite driveshaft 100 may possess desirable torsion stiffness to transmit torque from engines 24 to propeller 42, while also providing desirable bending and axial stiffness at each of first end 110 and second end 112. The presence of virtual hinge 130 allows composite driveshaft 100 to accommodate various positional changes of extending tail 14 relative to airframe 12 without adding weight, mechanical complexities (packaging, number of parts and the like) as would be provided with conventional hinge elements such as universal joints and the like. Further, composite driveshaft 100 may suppress vibrations due to material damping properties of, for example, FMC used to form virtual hinge 130.

In contrast to some prior diaphragm approaches, both the material (e.g., a flexible matrix) and the geometry of the hinge will allow for flexibility.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

We claim:

1. A composite driveshaft comprising:
   a body including a first end, a second end, and an intermediate portion defining a driveshaft axis (DSA), the first end defining a first coupling region and the second end defining a second coupling region, wherein at least one of the first and second coupling regions defines a virtual hinge configured to accommodate both bending moments and axial changes of the body;
   wherein the virtual hinge includes a first surface portion, a second surface portion and a third, cantilevered surface portion.

wherein the first surface portion extends at an angle relative to the driveshaft axis (DSA); and wherein the first surface portion includes a first end section at the intermediate portion and a second end section at the second surface portion, the second end section defining a neck region having a diameter that is less than a diameter of the intermediate portion.

2. The composite driveshaft according to claim 1, wherein the third surface portion extends over, at least in part, the first surface portion.

3. The composite driveshaft according to claim 1, wherein the second surface portion defines a bend region.

4. The composite driveshaft according to claim 1, wherein the virtual hinge is formed from one or more material sheets including one or more of a flexible matrix composite material, a rigid matrix composite material, and a hybrid matrix composite material.

* * * * *